(No Model.)
G. SMITH.
QUADRUPLEX TELEGRAPHY.
No. 366,695. Patented July 19, 1887.
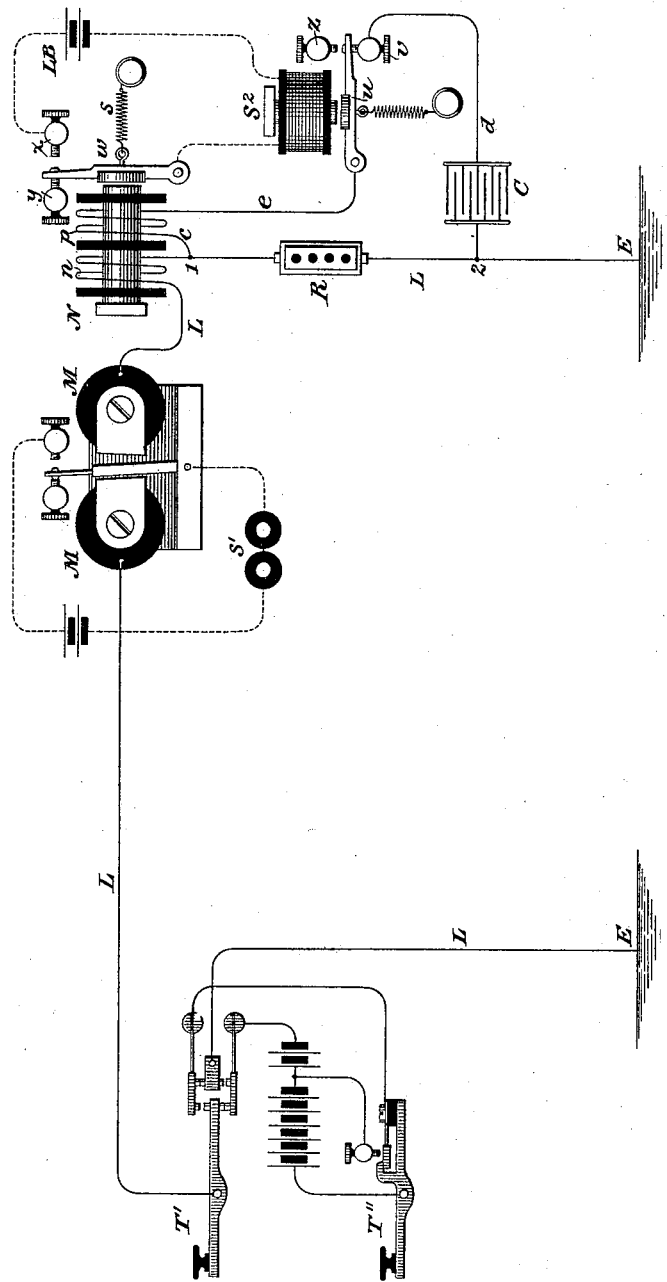
Witnesses
Geo. W. Breck.
Carrie E. Ashley
Inventor
Gerritt Smith,
By his Attorney
C. L. Buckingham

UNITED STATES PATENT OFFICE.

GERRITT SMITH, OF ASTORIA, NEW YORK, ASSIGNOR TO THE WESTERN UNION TELEGRAPH COMPANY, OF NEW YORK.

QUADRUPLEX TELEGRAPHY.

SPECIFICATION forming part of Letters Patent No. 366,695, dated July 19, 1887.

Application filed January 2, 1885. Serial No. 151,752. (No model.)

*To all whom it may concern:*

Be it known that I, GERRITT SMITH, of Astoria, county of Queens, State of New York, a citizen of the United States of America, have made a new and useful Improvement in Diplex and Quadruplex Telegraphs, of which the following is a specification.

In another application for a patent of even date herewith, I have described a condenser placed in a branch circuit at the receiving end of a diplex or quadruplex telegraph-line, and so arranged that the interval of no current during a reversal on the line is bridged over by a condenser-discharge in said branch, thereby preventing the withdrawal of the armature of the neutral relay by its retracting-spring.

In this system one message is transmitted by a pole-changing key, and is received upon a polar relay. A second message is transmitted by adding and removing battery, and is received upon a neutral relay. The pole-changing key serves both to reverse a single section of battery, which is normally on line, and also to reverse the entire battery, providing the second operator has his key depressed. If the key of the second operator were depressed and the battery were then reversed, the armature of the neutral relay, being attracted by the full battery, would, upon the reversal, be momentarily withdrawn by its retracting-spring to its back contact, thereby closing the sounder-circuit of the neutral relay, thus causing a signal upon the neutral relay by the reversal, whereas said neutral relay should only be responsive to an increase or a decrease of current.

By employing a condenser in a manner set forth in my other application the momentary effect of said condenser at its discharge upon the neutral relay is considerably greater than the main-line current itself. Thus, if while only the small section of battery is connected to line, reversals might occur without causing the armature of the neutral relay to be lifted from back contact. The discharge of the condenser upon a reversal would cause the armature of the neutral relay to be actuated, and to thereby open and close the sounder-circuit of said neutral relay and cause false signals. To prevent false signals by the vibration of the armature of the neutral relay upon its back contact by the reversals of the weaker section of the battery, it was necessary to subject the retracting-spring of said armature to a much higher tension than would be necessary if a condenser were not employed. To obviate the necessity for a higher adjustment of the retracting-spring of the neutral relay to prevent false signals upon reversing the weaker section of battery, I have provided an automatic circuit-breaker for the condenser branch, whereby said branch remains broken while the weaker section of battery only is connected to line, thus removing the condenser from operation at all such times. When additional battery is connected to line, the automatic circuit-breaker of the condenser branch closes said branch, and the condenser is then put in condition for operation precisely as is set forth in my other application.

I will now describe my invention by reference to the accompanying drawing.

L is a main line provided with two battery-sections, and key $T^2$ serves upon its down-stroke to remove a section of the main-line battery and to add said section upon its up-stroke, and key T' serves to reverse one or both of the two battery-sections, according to the position of the key $T^2$.

M is a polar relay for receiving signals transmitted by key T', and N is a neutral relay for receiving an independent set of signals by manipulation of key $T^2$.

N is provided with two coils—a primary coil, $n$, included in the main line, and a secondary coil, $p$, placed in the branch $c\,e\,d$—connected to the main line at points 1 and 2, and within which is also included a condenser, C, contact $v$, and armature $u$ of the local sounder $S^2$. While armature $w$ of the neutral relay rests at its back contact, $x$, the local circuit, including battery L B and sounder $S^2$, is closed, and thereby the armature $u$ is attracted to the insulated front stop, $z$, thus breaking the condenser branch. When, therefore, only the weaker section of battery is connected to line, armature $w$ rests against its back contact, $x$, and the condenser branch is rendered incapable of operation, thus enabling the armature $w$ to be firmly held against its back contact, $x$, with a weak adjustment of its retracting-spring $s$. When, however, both sections of battery at the transmitting-station are added to line, armature $w$ is held against its front insulated stop, $y$, thereby breaking the local circuit of sounder $S^2$ and permitting armature $u$ to be retracted to its back contact, $v$, thereby closing the condenser branch and rendering the condenser capable of operation, as is described in my preceding application.

What I claim, and desire to secure by Letters Patent, is—

1. In a diplex or quadruplex telegraph system, the combination of a neutral relay responsive to an increase or a decrease of current, a condenser branch one end of which is connected to the main line at a point between the neutral relay and the earth at the receiving end, while the other end of said condenser branch is connected directly to earth, and an automatic circuit-breaker for opening said condenser branch while only a weak current is on line, and for closing said condenser branch while a strong current is on line.

2. In a telegraph system, the combination of neutral relay N, having a primary coil, $n$, and a secondary coil, $p$, and a branch including a condenser and said secondary coil, and an automatic circuit-breaker, substantially as described.

3. In a diplex or quadruplex telegraph system, the combination of a neutral relay whose armature is provided with a weak retracting-spring, $s$, a condenser branch provided with an automatic circuit-breaker, and a resistance, R, substantially as described.

4. In a diplex or quadruplex telegraph system, the combination of a neutral relay having a local sounder, and a condenser branch which is opened and closed by the armature of said local sounder, substantially as described.

5. In a diplex or quadruplex telegraph system, the combination of a main line and a condenser branch connected to said main line and to the earth, and an automatic circuit-closer therefor.

6. In a diplex or quadruplex telegraph system, the combination of a main line, a neutral relay, a local sounder, and a condenser branch including a condenser and a coil of said neutral relay which is opened and closed by the armature of said local sounder.

GERRITT SMITH.

Witnesses:
WM. ARNOUX,
S. S. WATTERS.